(12) United States Patent
Olszowy et al.

(10) Patent No.: US 12,069,165 B2
(45) Date of Patent: Aug. 20, 2024

(54) INTELLIGENT AND SECURE PACKET CAPTURES FOR CLOUD SOLUTIONS

(71) Applicant: Cisco Technology, Inc., San Jose, CA (US)

(72) Inventors: Mateusz Olszowy, Cracow (PL); M. David Hanes, Lewisville, NC (US); Oliver W. Fagan, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 687 days.

(21) Appl. No.: 17/153,327

(22) Filed: Jan. 20, 2021

(65) Prior Publication Data

US 2022/0231837 A1 Jul. 21, 2022

(51) Int. Cl.
*H04L 9/08* (2006.01)
*G06K 7/14* (2006.01)
*H04L 65/401* (2022.01)

(52) U.S. Cl.
CPC ............ *H04L 9/085* (2013.01); *G06K 7/1413* (2013.01); *G06K 7/1417* (2013.01); *H04L 65/4015* (2013.01)

(58) Field of Classification Search
CPC ... H04L 9/085; H04L 65/4015; G06K 7/1413; G06K 7/1417
USPC ...................................................... 713/168
See application file for complete search history.

(56) References Cited

U.S. PATENT DOCUMENTS

| | | | |
|---|---|---|---|
| 2008/0155250 A1* | 6/2008 | Tanizawa | H04L 63/08 380/255 |
| 2008/0178004 A1* | 7/2008 | Wei | H04L 63/205 713/171 |
| 2012/0183134 A1* | 7/2012 | Malone | H04N 21/25875 380/28 |
| 2014/0282877 A1* | 9/2014 | Mahaffey | H04W 12/33 726/3 |
| 2014/0282927 A1* | 9/2014 | McLaughlin | G06F 21/35 726/5 |
| 2017/0185333 A1* | 6/2017 | Gauda | G06F 21/00 |
| 2017/0250982 A1 | 8/2017 | Yang | |
| 2017/0264663 A1 | 9/2017 | Bicket et al. | |
| 2018/0068309 A1* | 3/2018 | Mahaffey | G06Q 20/20 |
| 2018/0241727 A1 | 8/2018 | Verzun et al. | |
| 2019/0037002 A1* | 1/2019 | Arunachalam | H04L 41/22 |
| 2019/0080331 A1* | 3/2019 | Howald | H04L 9/006 |
| 2019/0124105 A1 | 4/2019 | Chauhan et al. | |
| 2020/0014816 A1 | 1/2020 | Speasl et al. | |
| 2020/0145391 A1* | 5/2020 | Sasidharan | H04L 9/0819 |

(Continued)

OTHER PUBLICATIONS

Cisco, "Cisco Webex Teams Application Security", Version 1.0, Oct. 2019, 44 pages.

(Continued)

*Primary Examiner* — Thanh T Le
(74) *Attorney, Agent, or Firm* — Edell, Shapiro & Finnan, LLC

(57) ABSTRACT

A packet capture operation is configured via a first computing device. The packet capture operation is configured to capture packets provided by a second computing device. The first computing device obtains an indication that a user is within a predetermined location proximity to the second computing device. The packet capture operation is initiated in response to obtaining the indication at the first computing device.

20 Claims, 7 Drawing Sheets

(56) References Cited

U.S. PATENT DOCUMENTS

| | | | |
|---|---|---|---|
| 2020/0366721 A1* | 11/2020 | Pang | H04L 65/80 |
| 2021/0006477 A1* | 1/2021 | Tan | H04L 65/65 |
| 2021/0288973 A1* | 9/2021 | Dimble | H04W 12/108 |
| 2021/0360394 A1* | 11/2021 | Yocam | H04N 21/42201 |
| 2022/0046415 A1* | 2/2022 | Chiang | H04L 63/0853 |
| 2022/0116786 A1* | 4/2022 | Daney De Marcillac | H04W 4/029 |
| 2022/0138746 A1* | 5/2022 | Rodriguez | H04L 63/0853 705/43 |
| 2023/0179589 A1* | 6/2023 | Kopack | H04L 63/0492 726/4 |
| 2023/0308303 A1* | 9/2023 | Jorasch | H04L 65/403 |

OTHER PUBLICATIONS

Cisco, "Cisco Intelligent Proximity", downloaded Jan. 19, 2021, 6 pages.

Cisco, "How to troubleshoot Cisco Proximity and ultrasound pairing", Mar. 31, 2014, 31 pages.

Wikipedia, "Personal area network", https://en.wikipedia.org/wiki/Personal_area_network, Dec. 26, 2020, 3 pages.

Wikipedia, "Near-field communication", https://en.wikipedia.org/wiki/Near-field_communication, Dec. 23, 2020, 19 pages.

Cisco, "Packet Capture Overview", downloaded Jan. 19, 2021, 8 pages.

Wikipedia, "QR code", https://en.wikipedia.org/wiki/QR_code, Jan. 18, 2021, 27 pages.

WinPcap, "Remote Capture", https://www.winpcap.org/docs/docs_412/html/group__remote.html, downloaded Jan. 19, 2021, 4 pages.

Cisco, "Remote Packet Capture", https://www.cisco.com/assets/sol/sb/WAP321_Emulators/WAP321_Emulator_v1-0-0-3/help/Admin30.html, downloaded Jan. 19, 2021, 2 pages.

"Connected Cloud Computing Services," Akamai, https://www.akamai.com/why-akamai, retrieved from the Internet on Aug. 77, 2023, 7 pages.

"Proximity," Cisco, https://proximity.cisco.com/, retrieved from the Internet on Aug. 7, 2023, 4 pages.

* cited by examiner

US 12,069,165 B2

INTELLIGENT AND SECURE PACKET CAPTURES FOR CLOUD SOLUTIONS

TECHNICAL FIELD

The present disclosure relates to providing packet captures, and in particular, packet captures in cloud network environments.

BACKGROUND

Network service provider engineers are heavily dependent on packet captures to troubleshoot customer quality issues. For an on-premises customer network, the onus of collecting these packet captures is usually on the customer. For example, many customers have an on-premises infrastructure based on a service provider's products and architecture. With this type of network, packet captures are made by the customer and then attached to a support case for evaluation by the service provider support engineers. By attaching these packet captures to the support case, there is implied consent that the service provider engineer can access and use these files to resolve the issue.

In cloud-based network services, the infrastructure is different. In cloud-based services, most of the infrastructure is in a cloud environment which is under the control and management of the service provider—the customer may maintain only an edge device. This same cloud infrastructure is used to provide services to multiple customers, with numerous packet flows from numerous customers leveraging the cloud infrastructure at any particular time. In cloud-based media services, such as online collaboration cloud services, a cloud environment may service hundreds of thousands of simultaneous audio and/or video media packet streams for thousands of customers. The cloud service provider may be under legal obligations to ensure the privacy and security of the customer data within these networks. In such cloud-based environments, the packet captures may happen in the cloud, rendering it unnecessary for the packet captures to be performed by the customer. When making these packet captures, the service provider needs to ensure that they meet the privacy and security obligations they have to their customers.

DESCRIPTION OF EXAMPLE EMBODIMENTS

Overview

According to example embodiments, the techniques of the present disclosure provide for cloud data packet captures, such as media packet captures. An association is made between a physical device and an application user or a cloud customer administrator before a recording (i.e., a packet capture) may be initiated. In example embodiments, a packet capture operation is configured via a first computing device. The packet capture operation is configured to capture packets provided by a second computing device. The first computing device obtains an indication that a user is within a predetermined location proximity to the second computing device. The packet capture operation is initiated in response to obtaining the indication at the first computing device.

Example Embodiments

Figure 1:
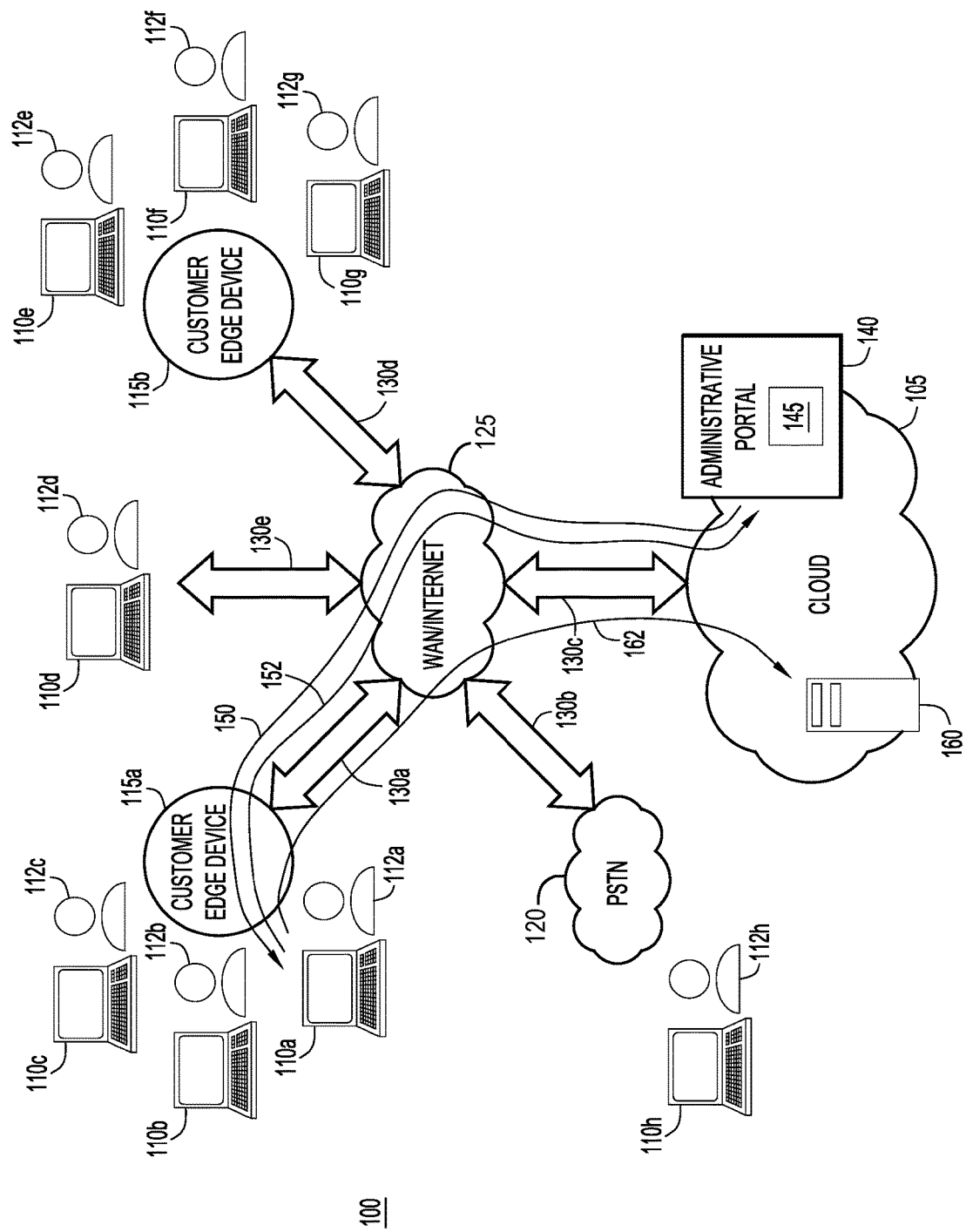
FIG. 1 is a depiction of a network environment configured to implement intelligent and secure packet captures for cloud-based solutions, according to an example embodiment.

With reference now made to FIG. 1, depicted therein is a network environment 100 configured according to the techniques of the present disclosure. Specifically, network environment 100 is configured to provide for secure packet captures in a cloud environment, and more specifically, to provide secure packet captures in a cloud environment by ensuring a predetermined location proximity between a user and the device from which the packet capture will be received.

As used herein, "location proximity" may be based on a distance between electronic devices that enable them to be in wireless communication using any of a variety of short-range or near field communication technologies, examples of which include ultrasonic frequency communications, radio frequency (RF) wireless communication (such as employing personal area network (PAN) technologies, such as Bluetooth® wireless communication technology), light communication, or any other means of near field communication techniques now known or hereinafter developed. Depending on a particular physical environment, "a predetermined location proximity" may range from a few meters (e.g., 0-2 meters, 2-5 meters, 5-10 meters) for an office, to tens of meters (e.g., 10-25 meters, 25-50 meters) for an auditorium, classroom or laboratory. For example, a user who is logged into and directly operates a device would be "within a predetermined location proximity" to that device. A user who is in the same room as a video conference endpoint device would be "within a predetermined location proximity" to that device.

In certain applications, such as media streams, video conferences, audio communications, and online collaborative sessions, cloud service provider engineers tasked with supporting these applications are heavily dependent on packet captures to troubleshoot complex voice and video media quality issues. For an on-premises collaboration network, the onus of collecting these packet captures is usually on the customer. For example, many customers have an on-premises infrastructure in which voice and video packet captures are made by the customer and then sent to the engineer as part of, for example, a support task or case. By sending the media captures to the engineer, the customer provides implied, or sometimes explicit, consent that the engineer may use these files to resolve the customer issue. Customers may initiate packet captures at any time in their own networks as it is their network and their data. Therefore, the responsibility for confirming the packet captures are appropriate for use by the troubleshooting engineer lies with the customer. Uploading the packet captures means permission has been implicitly granted to the service provider engineers to access the data contained in the packet captures.

In cloud-based implementations, the infrastructure is different. In many cloud-based infrastructures, the collaboration network is in the cloud with the end customer simply maintaining an edge device. In the example embodiment of network environment 100, the vast majority of the service infrastructure is contained within cloud environment 105. This infrastructure allows the service provider of cloud environment 105 to initiate packet captures in cloud environment 105. These packet captures may take place without the customer having to make the packet captures themselves. This is, on the one hand, a benefit of cloud implementations as it is the customer expectation with a cloud service that the cloud provider has the access to the packets needed to implement a packet capture, since the service provider is providing the network infrastructure. Enabling service providers to perform packet captures in this manner involves a level of trust between the service provider and the customer—the customer trusts that the service provider will only capture packets from users and devices to which permission is explicitly granted. Furthermore, many cloud service providers may have a legal obligation to protect sensitive customer data and only capture the media streams that have been explicitly allowed by the customer.

Therefore, it is desirable to explicitly confirm that the devices and users associated with a packet capture are truly associated with the customers that request the capture before packet captures are made within cloud environment 105. Because there are many shared resources and workspaces attached to the cloud, it is necessary to validate that the user and device have been correctly associated before making the packet capture in the cloud. Moreover, the end user should be notified of and given the opportunity to approve the packet capture to make sure it is an authorized action. Consider, for example, that a bad actor may gain access to the administrative portal of a customer site. This bad actor may be able to surreptitiously/secretly record someone's conversations via a packet capture operation. Without the proper checks, company executives in a board meeting, a political campaign strategy meeting, and a multitude of other meetings where privacy is critical, could be recorded from cloud environment 105 and that data attached to a service case or provided to a fraudulent user posing as the end customer.

In reality, making these captures and respecting the customer's trust and privacy in a cloud environment, such as cloud environment 105, is challenging. Cloud platforms often remain in the middle of a media path between endpoint devices. For example, cloud environment 105 includes edge devices 115a and 115b which provide endpoint devices 110a-h, each of which may be associated with a respective user 112a-h, with access to cloud environment 105. Cloud environment 105 maybe located within the media pathway between the customer's network and other networks, such as Public Switched Telephone Network (PSTN) 120, Wide Area Network (WAN) or the Internet 125, and other carriers. The number of different network segments (e.g., the network segments 130a-e shown in FIG. 1 in the media paths) may lead to complex bugs or audio/video quality problems. To troubleshoot them, it may be necessary to collect the media packets, which is difficult to implement in a secure and scalable way. For example, there may be hundreds of thousands of calls being processed at once in the cloud infrastructure. Such a call volume may make it difficult to identify the exact user and their respective device, particularly in environments with shared workspaces and users having multiple devices at their disposal. The challenges in identifying the user and their device also means that it is difficult to identify the packets associated with that user.

According to the embodiments presented herein, techniques are provided for that allow for the initiation of media captures in cloud environments with customer authorization and verification so that resolving media quality cases may be resolved efficiently while providing appropriate privacy checks.

Specifically, included in cloud environment 105 is administrative portal 140 that executes location proximity-based packet capture logic 145. As described in greater detail below, location proximity-based packet capture logic 145 ensures that a user whose packets are intended to be captured is within a predetermined location proximity of the device from which the packets will be captured, ensuring that the packets are being captured from the correct user's device and that the packet capture has been requested by a trusted party. While location proximity-based packet capture logic 145 is illustrated as residing in cloud environment 105 as part of administrative portal 140, this logic may reside elsewhere within cloud environment 105.

As illustrated in FIG. 1, administrative portal 140 and location proximity-based packet capture logic 145 configure a media packet capture operation to take place from endpoint device 110a. The media packet capture operation may be initiated by, for example, a customer administrator requesting a packet capture via customer administrative portal 140. An example of such a customer administrative portal may be the Webex® Customer Experience (CX) Cloud portal. More specifically, a customer administrator may log into administrative portal 140 and initiate a packet capture. The packet capture is facilitated through message 150, which is sent from location proximity-based packet capture logic 145 of administrative portal 140. If endpoint device 110a is configured as a location proximity-aware device, endpoint device 110a may automatically respond to location proximity-based packet capture logic 145 with message 152 which confirms that the user 112a associated with the packet capture, or an administrator who has requested the packet capture, is within a predetermined location proximity to endpoint device 110a.

As indicated above, message 152 is shown as a response to message 150. According to other example embodiments, cloud environment 105 may be made aware of a predetermined location proximity between a user and an endpoint device (e.g., a predetermined location proximity between user 112a and endpoint device 110a) as soon as the user and the endpoint device come into the predetermined location proximity with each other. According to such example embodiments, message 152 may be sent prior to message 150. An example of such a message 152 is explained in detail with reference to FIG. 4, below.

As used herein, "location proximity-aware" refers to a device that is able determine when other devices are within a predetermined location proximity to the location proximity-aware device. A location proximity-aware device may be configured to determine a predetermined location proximity between itself and another device, such as the predetermined location proximity between endpoint device 110a and another device associated with user 112a using numerous techniques known to the skilled artisan. For example, a predetermined location proximity between endpoint device 110a and another device associated with user 112a may be determined using ultrasonic communications, Bluetooth communications, Wi-Fi® (i.e., wireless network protocols based on the IEEE 802.11 family of standards) signal strength values, Near Field Communication (NFC) messages, Global Positioning System (GPS) data, and other techniques known to the skilled artisan. Specific example technologies include the International Organization for Standardization and the International Electrotechnical Commission (IOS/IEC) standard number 18092 or the Bluetooth Low Energy (BLE) standard. Based on these communications and signals, endpoint device 110a may be able to determine that it is within a predetermined location proximity with user 112a via a smartphone, laptop, tablet, NFC enabled badge or fob, or other device associated with user 112a. With the predetermined location proximity between endpoint device 110a and user 112a confirmed, endpoint device 110a indicates the confirmed predetermined location proximity to location proximity-based packet capture logic 145 via message 152.

Accordingly to other example embodiments in which endpoint device 110a is not configured as a location proximity-aware device, message 150 may include a notification to the user or users, such as user 112a. This notification may identify the specific users whose data will be captured in the packet capture operation. Message 150 may also include a human consumable verification code for the packet capture. For example, message 150 may include a Quick Response (QR) code, a barcode, a numeric code, a particular image, or some other form of identifying information that will synchronize the user who receives the message with the physical device from which the packet capture is to take place. For example, message 150 may be sent to endpoint device 110a, and user 112a will respond to the message via message 152 which confirms that the user is within a predetermined location proximity to endpoint device 110a.

According to other example embodiments, message 150 may be sent to another device, such as a smart phone, tablet, laptop, user workstation, or another device associated with user 112a. User 112a may then respond to the message via message 152 using endpoint device 110a, confirming that endpoint device 110a is within a predetermined location proximity to user 112a.

The form of message 150 may be an instant messaging (IM) message, a short message service (SMS) message, an email, a two-factor authentication application message, or another type of message now known to the skilled artisan or hereafter developed.

With the predetermined location proximity between user 112a and endpoint device 110a confirmed, location proximity-based packet capture logic 145 may initiate the packet capture. As noted above, cloud environment 105 may service hundreds of thousands of packet streams at any particular time, making it difficult to identify which packets are associated with the designated packet capture operation. Therefore, in addition to configuring and executing the packet capture operation only after the predetermined location proximity between user 112a and endpoint device 110a is determined, location proximity-based packet capture logic 145 may also be configured to establish a dedicated media node 160 for receipt of the packets sent from endpoint device 110a. Specifically, the packets are directed to a dedicated media node instance to mitigate a risk of capturing unrelated connections. The dedicated media node 160 may decrypt the packet stream "on-the-fly", that is, as they arrive. Accordingly, packet capture stream 162 is sent from endpoint device 110a to dedicated media node 160. According to the example embodiment of FIG. 1, dedicated media node 160 is logically arranged within cloud environment 105. According to other example embodiments, dedicated media node 160 may be embodied as an endpoint device, such as one or more of endpoint devices 110b-h.

Once the packets are captured and sent to the dedicated media node 160, the results of the packet capture operation may be made available to cloud service provider engineers tasked with supporting cloud environment 105. For example, the results may be posted to a collaborative work space, such as a Webex Teams space or another similar collaborative work tool. According to other example embodiments, the results may be sent to particular individuals via email or other communication tools. According to still other example embodiments, the results of the packet capture may be posted to a management or administrative portal via which administrators access and initiate packet captures.

As noted above, it is desirable that packet captures be kept secure. This is not only because of customer expectations and the trust placed in service providers, but because in some instances services providers are under a legal obligation to ensure the security of customer data. Accordingly, the results of the packet capture operation may be encrypted using, for example, a shared secret generated at the time the packet capture is configured. For example, when location proximity-based packet capture logic 145 configures the packet capture operation, location proximity-based packet capture logic 145 may also generate a shared secret. The shared secret may be generated using a Key Management Service associated with cloud environment 105. An administrator may control this shared secret such that the results of the packet capture can only be viewed via certain portals within cloud environment 105 or only provided to select users.

Figure 2:
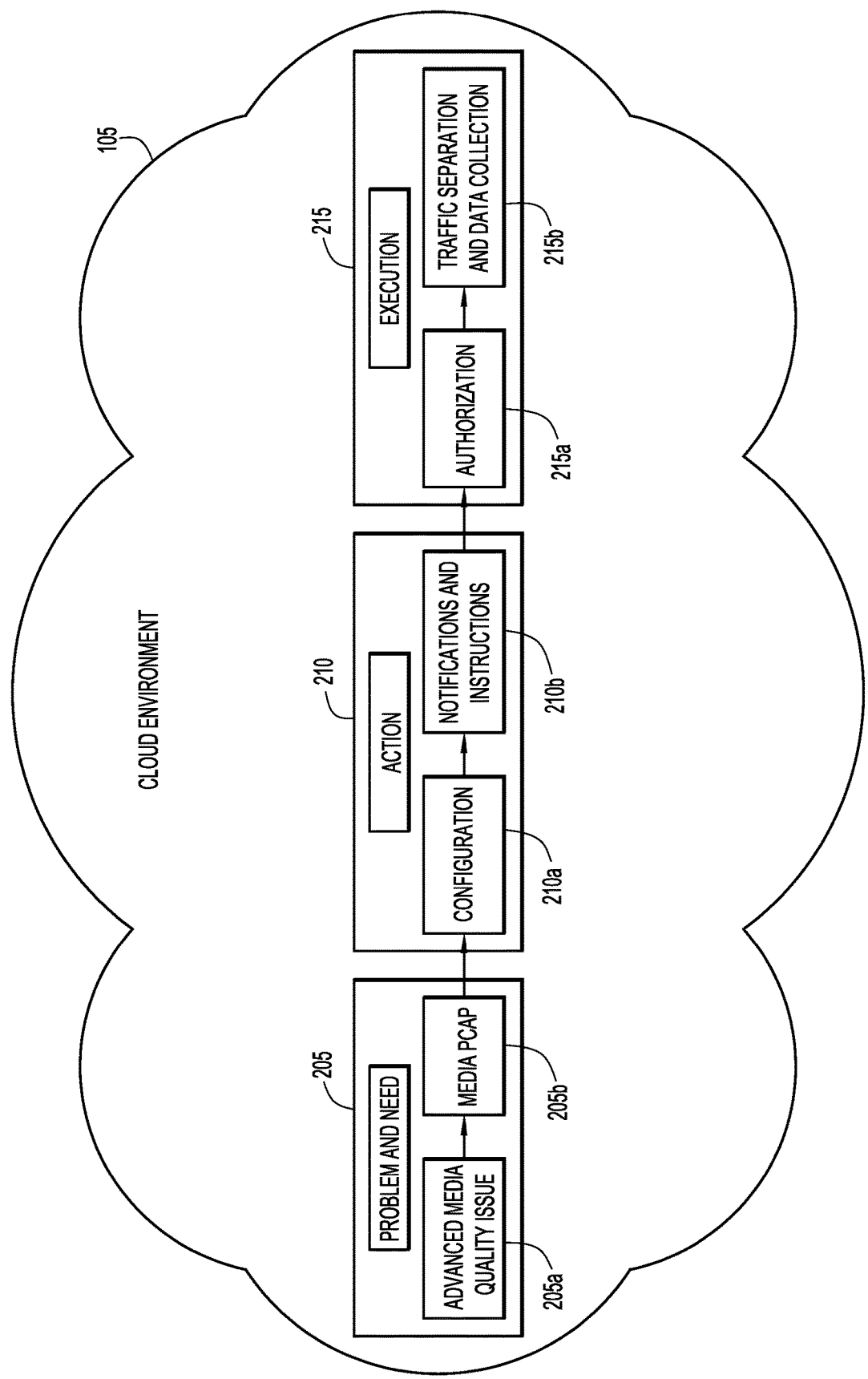
FIG. 2 is an illustration of the challenges that may be addressed through the intelligent and secure packet capture techniques of the present disclosure, actions taken to implement secure packet captures according to the techniques of the present disclosure, and the execution of the secure packet capture techniques of the present disclosure, according to an example embodiment.

Referring now to FIG. 2, the techniques presented herein solve the problems and needs 205 through actions 210 which result in executions 215. More specifically, the problems encountered in cloud environments, such as cloud environment 105, include quality issues 205a. Packet captures 205b are needed to resolves these issues. According to some specific example embodiments, the quality issues may be related to advanced media applications, such as online collaborative sessions that include audio and/or video streams, particularly in cloud environments. Other quality issues may be experienced in other cloud environment applications, such as Internet of Things (IoT) cloud applications and Cloud Security applications.

In order to implement these packet captures, actions 210 are taken, which may include configuration of the packet capture 210a and notifications and instructions 210b. For example, the configurations 210a may include the configuration of a packet capture by a customer administrator through a customer administrative portal, as described above in connection with FIG. 1. Configuration 210a may also include generating a shared secret that will be used to encrypt and access the data that is collected as part of execution 215. Notifications and instructions 210b may include the sending of messages to users and/or user devices to confirm a predetermined location proximity between the user and device as described above with reference to FIG. 1.

Finally, executions 215 may include the authorization 215a of the packet capture, either automatically with a location proximity-aware device or through user confirmation, as described above with reference to FIG. 1. Traffic separation and data collection 215b may be implemented through the establishment of a dedicated media node, as described above with reference to FIG. 1. Traffic separation and data collection 215b may also include encrypting the traffic such that it can only be opened using the shared secret, as described above with reference to FIG. 1.

In summary, in order to implement the actions 210 of FIG. 2, the following may be performed.

A customer administrator may enable packet capture in a customer administrative portal on a per user/device basis. The administrator may also indicate a collaboration application space or other location for receipt of the packet capture outputs. The administrator may also indicate users that are to be notified of packet captures. The administrator may also set a time period, a collaboration session identifier, or a specific user action, such as joining a meeting, which may serve as a trigger for a packet capture. An individual user may also just initiate a packet capture with a button enabled in the collaboration application itself. Similar techniques may be used to enable packet captures for other applications, such as IoT applications and cloud security applications.

An administrator may optionally generate a shared secret to better protect the data once downloaded by authorized users. The administrator may control this shared secret so that the packet capture may only be viewed within the administrative portal or provided to select users. Accordingly, the administrator maintains control over who can decrypt the packet capture results file.

Location proximity-based packet capture logic, such as location proximity-based packet capture logic 145 of FIG. 1, may send a notification to a user or users through, for example, a collaboration application, an instant messaging application, an SMS text, an email or another message now known to the skilled artisan or hereafter developed. This notification may identify the specific user(s) whose packets will be captured. The notification may include a human consumable message about the packet capture event, such as a QR code, barcode, numeric code or image. This code may be used to synchronize the user with the physical device being used by the user. According to other example embodiments, if a device supports location proximity-awareness, then verifying the user and device physical association is automatic, leveraging the location proximity functionality in the user devices for making the physical association between the user and the device. Additionally, location proximity may be enhanced to enforce a level of additional authentication by prompting the user for a form of biometric authentication, such as facial recognition, fingerprint recognition, voice recognition, retinal scan authentication, or others known to the skilled artisan.

The executions 215 of FIG. 2 may include the following.

The packet capture may be automatically directed to a dedicated media node instance to mitigate a risk of capturing unrelated connections. The media node may decrypt the stream on the fly using the shared secret. According to other example embodiments, the encryption and decryption may take place via other means, such as through the use of encryption keys generated from a security function of a cloud environment, such as a key server.

The output files of the packet capture may be posted in a previously selected collaboration application space or other location. The output files of the packet capture may also be posted to the administrative portal, and the administrator with the shared secret may provide viewing or download access to select user accounts, such as the accounts of the cloud service engineers supporting the application for which the packet capture was implemented.

Figure 3:
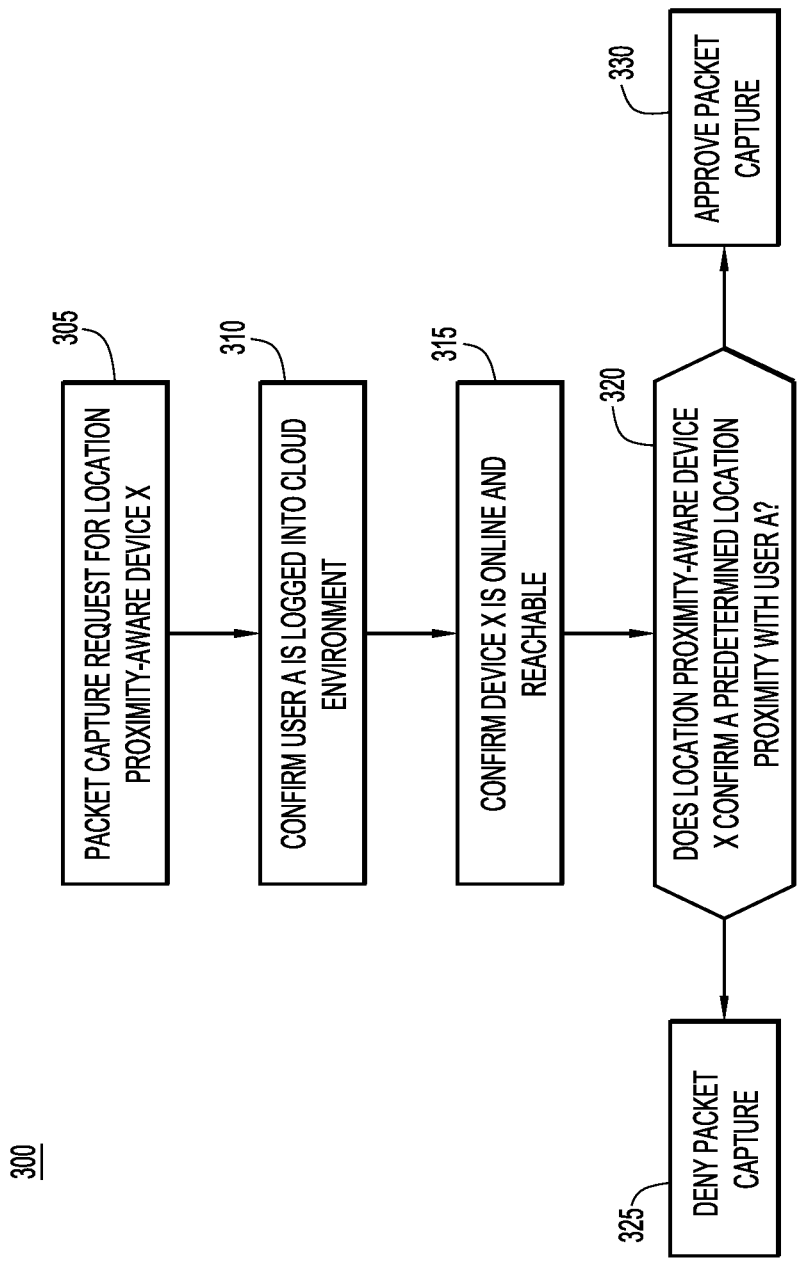
FIG. 3 is a flowchart illustrating a first process flow for implementing the intelligent and secure packet capture techniques that leverage location proximity-aware devices, according to an example embodiment.

With reference now made to FIG. 3, depicted therein is a flowchart 300, illustrating a process flow for implementing the techniques of the present disclosure in conjunction with location proximity-aware devices. Flowchart 300 begins in operation 305 in which a packet capture request is made. The request is for a packet capture for a location proximity-aware device which may be used by a particular user. The packet capture of operation 305 may be made by a customer administrator using an Internet-based administrative portal.

In operation 310, location proximity-based packet capture logic associated with the administrative portal, such as location proximity-based packet capture logic 145 of FIG. 1, confirms that the user for whom the packet capture has been requested is logged into the cloud service, such as an online collaboration cloud service. In operation 315, it is confirmed that the device for which the packet capture has been requested is online and reachable.

Next, in operation 320 a determination is made as to whether or not the user is within a predetermined location proximity to the device, with "location proximity" defined as set forth above with reference to FIG. 1. According to specific example embodiments, the determination of operation 320 may be made in response to a message exchange between the administrative portal and the device for which the packet capture has been requested. For example, the determination of operation 320 may be embodied as exchanges of messages 150 and 152 as described above with reference to FIG. 1. According to other example embodiments, the determination that the user is within a predetermined location proximity to a location proximity-aware device may be made prior to the packet capture request, as explained in detail below with reference to FIG. 4.

If the device is unable to confirm that that the user is in location proximity to the device, the packet capture is denied in operation 325. On the other hand, if the device confirms location proximity with the user, the packet capture is confirmed in operation 330.

The process of flowchart 300 may include additional operations not explicitly included in FIG. 3. For example, the process of flowchart 300 may also include the designation of a dedicated media node to which the packet capture may be directed. Similarly, the process flow may also include the generation of a shared secret and providing the shared secret to individuals or groups with permission to access the results of the packet capture.

Figure 4:
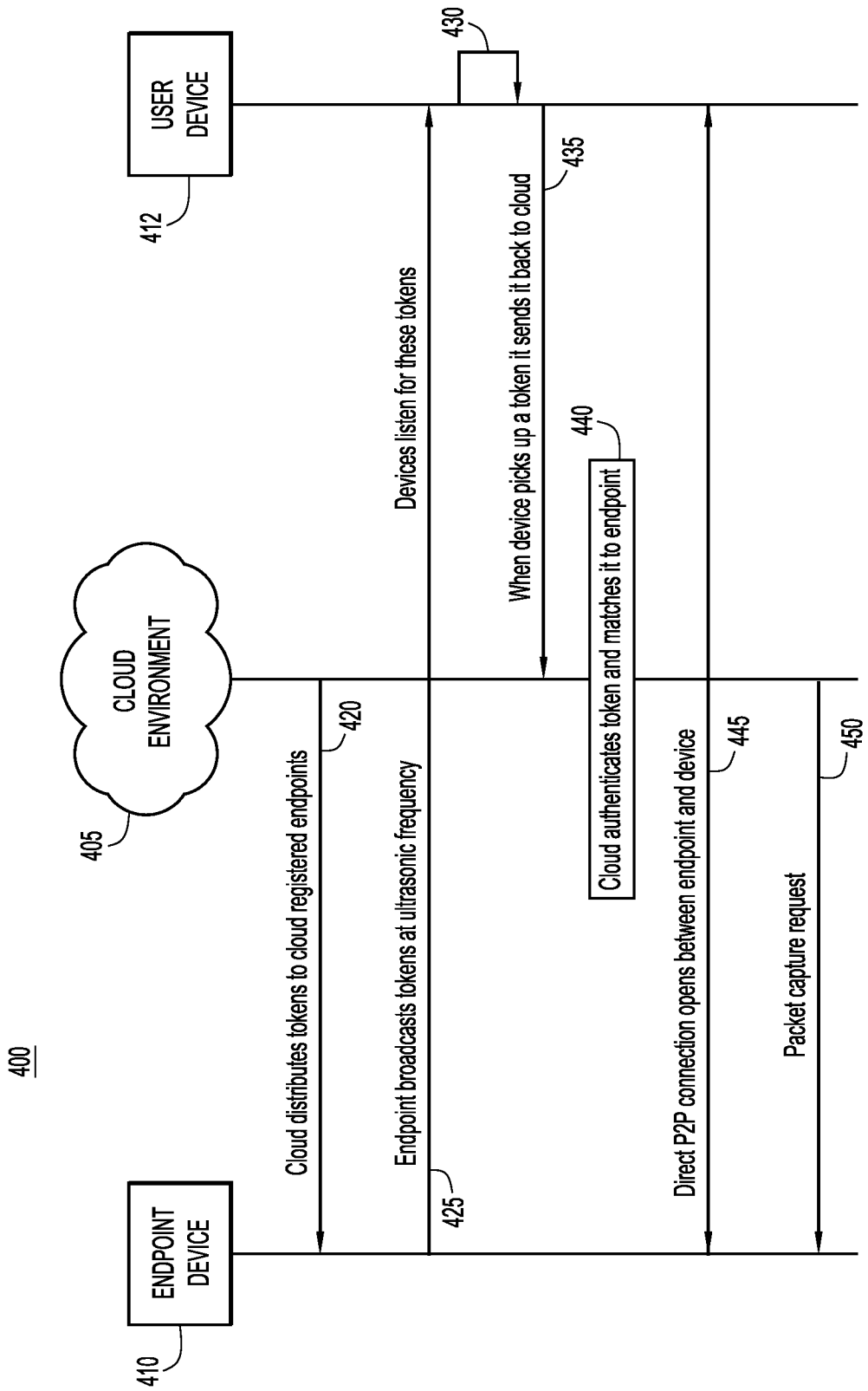
FIG. 4 is a call flow diagram illustrating a call flow for confirming a predetermined location proximity between a location proximity-aware device and a user, for use in the intelligent and secure packet capture techniques of the present disclosure, according to an example embodiment.

With reference now made to FIG. 4, depicted therein is a call flow 400 illustrating a process by which a cloud environment 405 receives an indication of a predetermined location proximity between an endpoint device 410 and a user device 412. As described above with reference to FIG. 1, a cloud environment may be made aware of a predetermined location proximity between a user or user device and an endpoint device in response to a request for a packet capture operation. As noted above, certain cloud environments, such as cloud environment 405, may be made aware of a predetermined location proximity between an endpoint device 410 and a user device 412 as soon as user device 412 comes within a predetermined location proximity with endpoint device 410, even prior to the configuration or initiation of a packet capture operation.

Call flow 400 begins with message 420, via which cloud environment 405 distributes tokens to cloud-registered endpoint devices, including endpoint device 410. The tokens distributed to endpoint device 410 may serve as a key that will allow user device 412 and endpoint device 410 to authenticate a peer-to-peer connection using cloud environment 405.

In operation 425, endpoint device 410 broadcasts the tokens using a near field communications technology and user device 412 listens for the tokens. According to the specific example embodiment of FIG. 4, endpoint device 410 broadcasts the tokens using an ultrasonic communication technique. According to other example embodiments, endpoint device 410 may broadcast the tokens using another near field communication technology, such as signals sent according to the BLE standard.

In operation 430, user device 412 detects the token, and in operation 435, user device 412 transmits the token to cloud environment 405. In operation 440, cloud environments 405 authenticates the token and matches it to endpoint device 410. Put differently, the content of the token received by cloud environment 405 indicates that it was one of the tokens distributed to endpoint device 410. Because the token was distributed via a near field communications technology, receiving the token from user device 412 confirms to cloud environment 405 that user device 412 is within a predetermined location proximity to endpoint device 410.

With predetermined location proximity between endpoint device 410 and user device 412 confirmed, a peer-to-peer connection may be established between endpoint device 410 and user device 412, as illustrated in operation 445. Finally, with the predetermined location proximity between endpoint device 410 and user device 412 confirmed, when a packet capture request is sent in operation 450, cloud environment 405 may allow the packet capture to proceed. Applying call flow 400 of FIG. 4 to the network environment of FIG. 1, the transmission of the token to cloud environment 405 may correspond to message 152 of FIG. 1, with operation 450 of FIG. 4 corresponding to message 150 of FIG. 1.

Figure 5:
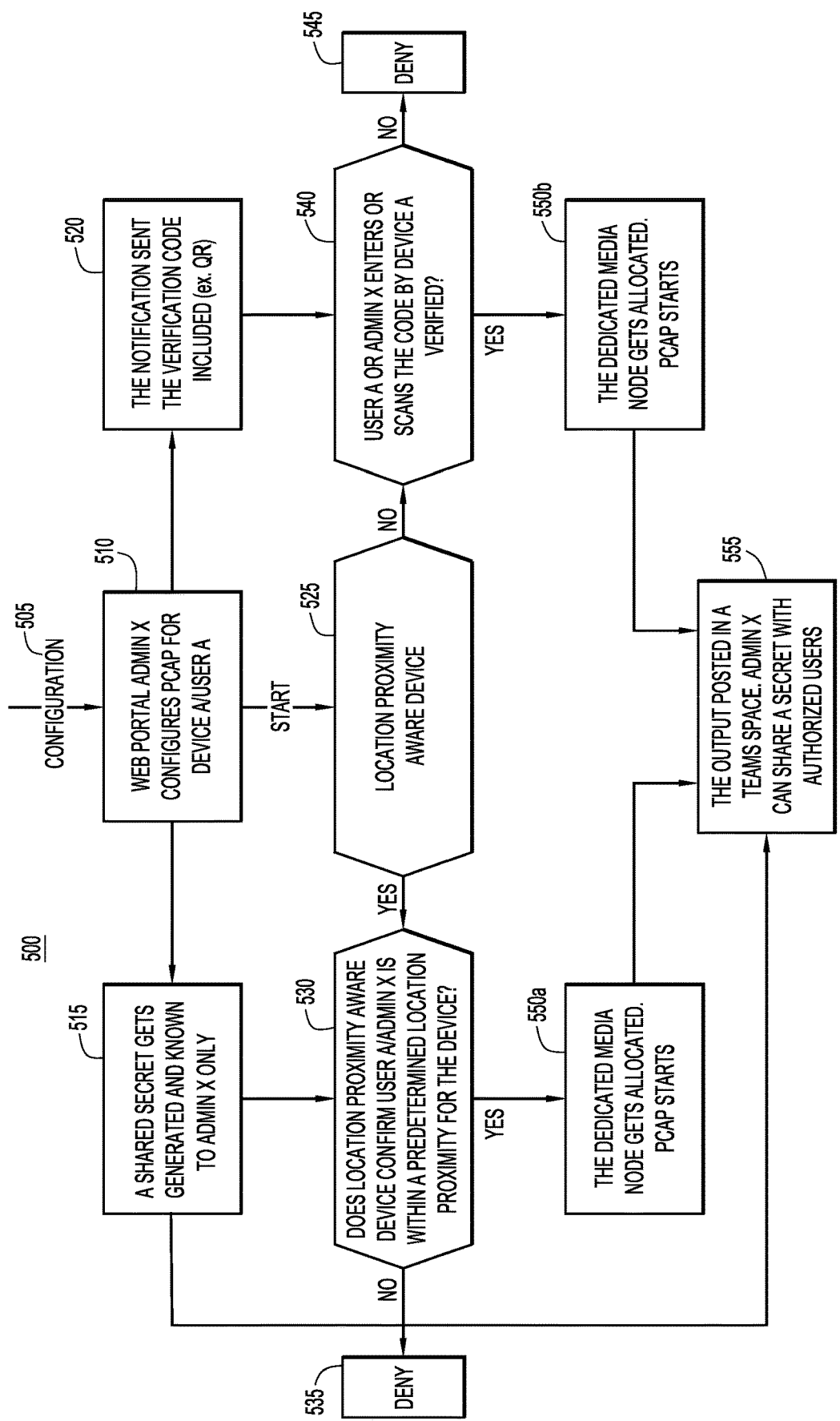
FIG. 5 is a flowchart illustrating a second process flow for implementing the intelligent and secure packet capture techniques that leverage both location proximity-aware devices and devices that are not location proximity-aware, according to an example embodiment.

Another embodiment of the techniques of the present disclosure is illustrated in flowchart 500 of FIG. 5. As illustrated therein, the process flow of flowchart 500 begins in operation 505 where the devices within a network environment are configured for packet capture operations. For example, operation 505 may be embodied as a customer administrator configuring customer devices to implement packet capture operations. In operation 510, a particular packet capture operation is configured for a specific device associated with a user. A shared secret that may be used to encrypt and/or access the results of the packet capture is generated, as illustrated in operation 515.

In operation 520, a notification is sent to the user for whom the packet capture has been requested. According to the example embodiment of FIG. 5, the notification is sent regardless of whether the device from which the packets will be capture is configured with location proximity-awareness. This ensures that the user is aware of the packet capture even when the device is location proximity-aware and the user will not be required to confirm predetermined location proximity to the device. The notification may include a verification code, such as a QR code as described above with reference to FIG. 1, which may be used in operation 540 to confirm predetermined location proximity between the device and the user or administrator for devices that are not location proximity-aware. Also according to the example embodiment depicted in flowchart 500, the notification may be sent via a messaging application associated with the cloud application for which the packet capture is being requested. As noted above with reference to FIG. 1, the notification may be sent via other means, such as email or SMS messaging.

The process flow of flowchart 500 splits at operation 525 depending on whether or not the device is configured with location proximity-awareness. If the device is location proximity-aware, the device will confirm predetermined location proximity to the user or administrator in operation 530. For example, predetermined location proximity between a user or administrator and the device may be determined based on operations like those illustrated with reference to FIG. 4, above. According to other example embodiments, the configuration of the packet capture in operation 510 may result in a message being sent to the device, and a response received from the device may confirm predetermined location proximity between the device and the user or administrator.

In operation 530, the predetermined location proximity to the device of the user, the administrator or both, may be used to allow the packet capture operation to take place, with "location proximity" defined as set forth above with reference to FIG. 1. For example, if the administrator is within a predetermined location proximity to the device from which the packet capture has been requested, it ensures that the packet capture is not being requested by a malicious actor. Similarly, because the user has been notified of the packet capture in operation 520, if the user is within a predetermined location proximity to the device, it is ensured that the packet capture is known to the user of the device from which the capture is being made. If the location proximity-aware device is unable to confirm the predetermined location proximity of the user or administrator to the device, the packet capture is denied in operation 535.

If the packet capture is requested for a device that is not location proximity-aware, operation 540 follows operation 525. In operation 540, it is determined whether or not the verification code sent in operation 520 is returned to the administrative portal via the device. Because the code is was sent to the user or administrator and returned via the device for which the packet capture is requested, it is may be confirmed that the user or administrator is within a predetermined location proximity to the device.

According to the example embodiment of flowchart 500, the message is sent to the user or administrator and returned by the device for which the packet capture is requested to ensure a predetermined location proximity between the user or administrator and the device. According to the other example embodiments, the verification code may be sent to the device for which the packet capture is requested and returned by the user or administrator, also confirming predetermined location proximity between the user or administrator and the device.

If the verification code is not returned, the packet capture is denied in operation 545. Next, if operations 530 or 540 result in confirmation of predetermined location proximity between the user or administrator and the device, the two processing paths converge in operations 550*a* and 550*b* where the dedicated media node is allocated and the packet capture begins. In operation 555, the results of the completed packet capture are provided to authorized individuals, such as cloud engineers with whom the secret generated in operation 515 has been shared. According to the specific example of FIG. 5, the results of the packet capture are posted to a share space in an online collaboration cloud system, the same system for which the packet capture was requested.

Figure 6:
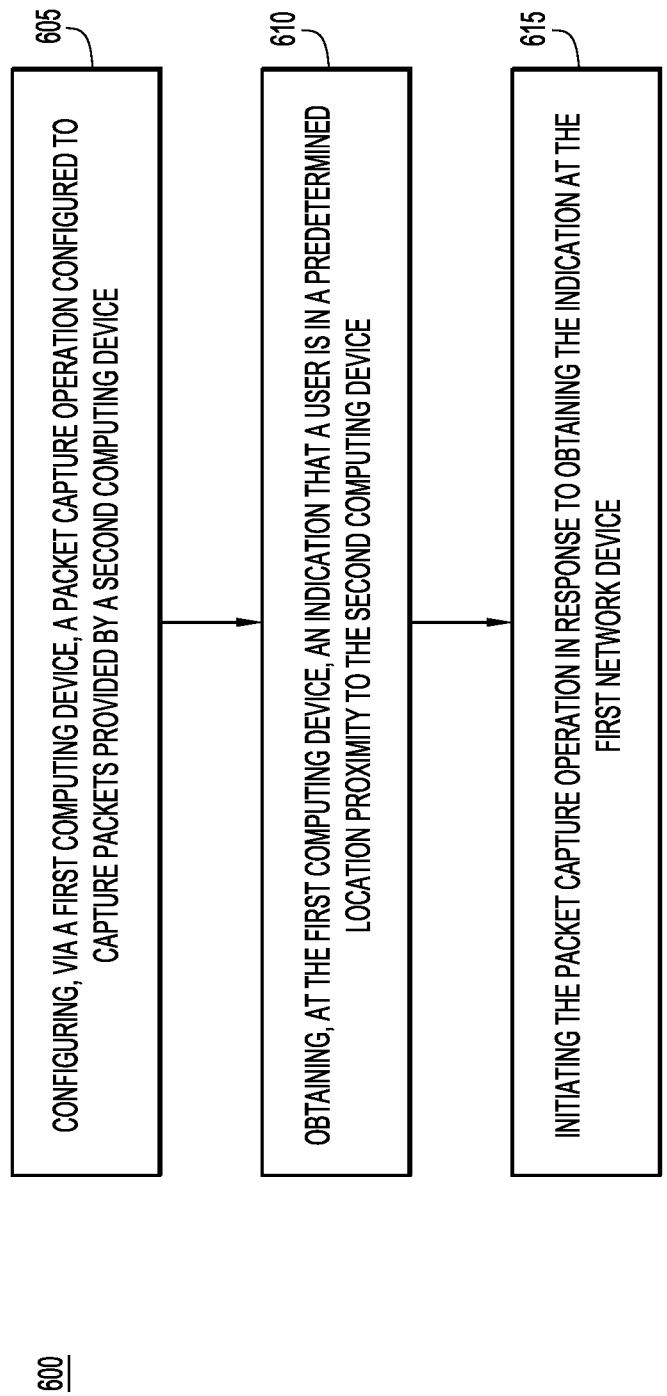
FIG. 6 is a flowchart illustrating a generalized process flow for implementing the intelligent and secure packet capture techniques of the present disclosure, according to an example embodiment.

With reference now made to FIG. 6, depicted therein is a flowchart 600 illustrating a process flow that generalizes the techniques of the present disclosure for secure packet captures from devices that are location proximity-aware, as well as devices that are not location proximity-aware. The process flow begins in operation 605 where a packet capture operation is configured via a first computing device. Operation 605 may be embodied as the operations described above with reference to FIGS. 1-5. For example, operation 605 may be embodied as a customer administrator logging into an administrative portal of a cloud service provider and configuring a packet capture operation for packets that traverse a cloud environment. The packet capture may be initiated for a device that is location proximity-aware or for a device that is not location proximity-aware. Accordingly, operation 605 may include the sending of messages to determine the predetermined location proximity between the second computing device and a user or administrator, such as message 150 of FIG. 1, or the message sent in operation 520 of FIG. 5. According to other example embodiments, operation 605 may be embodied as cloud environment 405 sending a packet capture request in operation 450 of FIG. 4. Accordingly, operation 605 may take place after an indication of predetermined location proximity between a user and the second computing device has been received.

In operation 610, an indication is received at the first computing device indicating that a user is within a predetermined location proximity to the second computing device, with "location proximity" defined as set forth above with reference to FIG. 1. Operation 610 may be embodied as one or more of the operations described above with reference to FIGS. 1-5 in which the administrative portal determines that a user or a customer administrator is within a predetermined location proximity to the device from which the packets of the packet capture operation are obtained. For example, operation 610 may be embodied as the receipt of message 152 of FIG. 1. According to other example embodiments, operation 610 may be embodied as cloud environment 405 receiving a token from user device 412 as illustrated in operation 435 of FIG. 4. Therefore, the receipt of the indication by the first computing device in operation 610 may take place prior to the configuring of the packet capture operation in operation 605.

The user recited in operation 610 may be a user of the second computing device or a user of, for example, an administrative portal via which the packet capture is configured. Furthermore, the indication obtained in operation 610 may be obtained from a location proximity-aware second computing device. Accordingly, the second computing device may automatically provide the indication to the first computing device that it is within a predetermined location proximity to the user.

According to other example embodiments, the indication may be received from the user via the second computing device in response to the user receiving a message with a verification code. This message may be received by the user via a device other than the second computing device, such as from the user's mobile phone, laptop, tablet or other personal computing device. According to still other example embodiments, the indication may be provided by the second computing device in response to a message received at the second computing device and consumed by the user, or received at a device other than the second computing device, such as from the user's mobile phone, laptop, tablet or other personal computing device.

Finally, in operation 615, the packet capture is initiated in response to obtaining the indication at the first computing device. Accordingly, operation 615 may be embodied as the initiation of a packet capture operation as described above with reference to FIGS. 1-5. For example, operation 615 may be embodied as the determination that the user is within a predetermined location proximity to the device in operation 320 of FIG. 3, operation 530 of FIG. 5 and/or operation 540 of FIG. 5.

As would be understood by the skilled artisan, the techniques of the present disclosure may be implemented using more or fewer operations than as described with reference to FIG. 6, without deviating from the disclosed inventive concepts. For example, additional operations, such as allocating a dedicated media node to the packet capture operation, generating a shared secret, sharing the shared secret, or accessing the results of the packet capture operation may be included in a process flow without deviating from the inventive concepts of the present disclosure.

In summary, the techniques of the present disclosure provide for methods, devices and computer readable media that implement a cloud customer portal to initiate, approve, and protect cloud data packet captures, such as media packet captures, that may contain sensitive customer data and/or Personally Identifiable Information (PII). According to specific example embodiments, an association is made between a physical device and a user or a cloud customer administrator before a recording (i.e., a packet capture) may be initiated.

The techniques of the present disclosure provide for the protection and privacy of customer data. Media captures are a good example of very sensitive data that is often required for troubleshooting purposes but needs to be properly protected within the cloud environment, a goal which may be achieved through implementations of the techniques of the present disclosure. Accordingly, the techniques disclosed herein may provide for a validation and authentication mechanism to collect such data and secure it with encryption/dedicated media instances following a user's consent.

Figure 7:
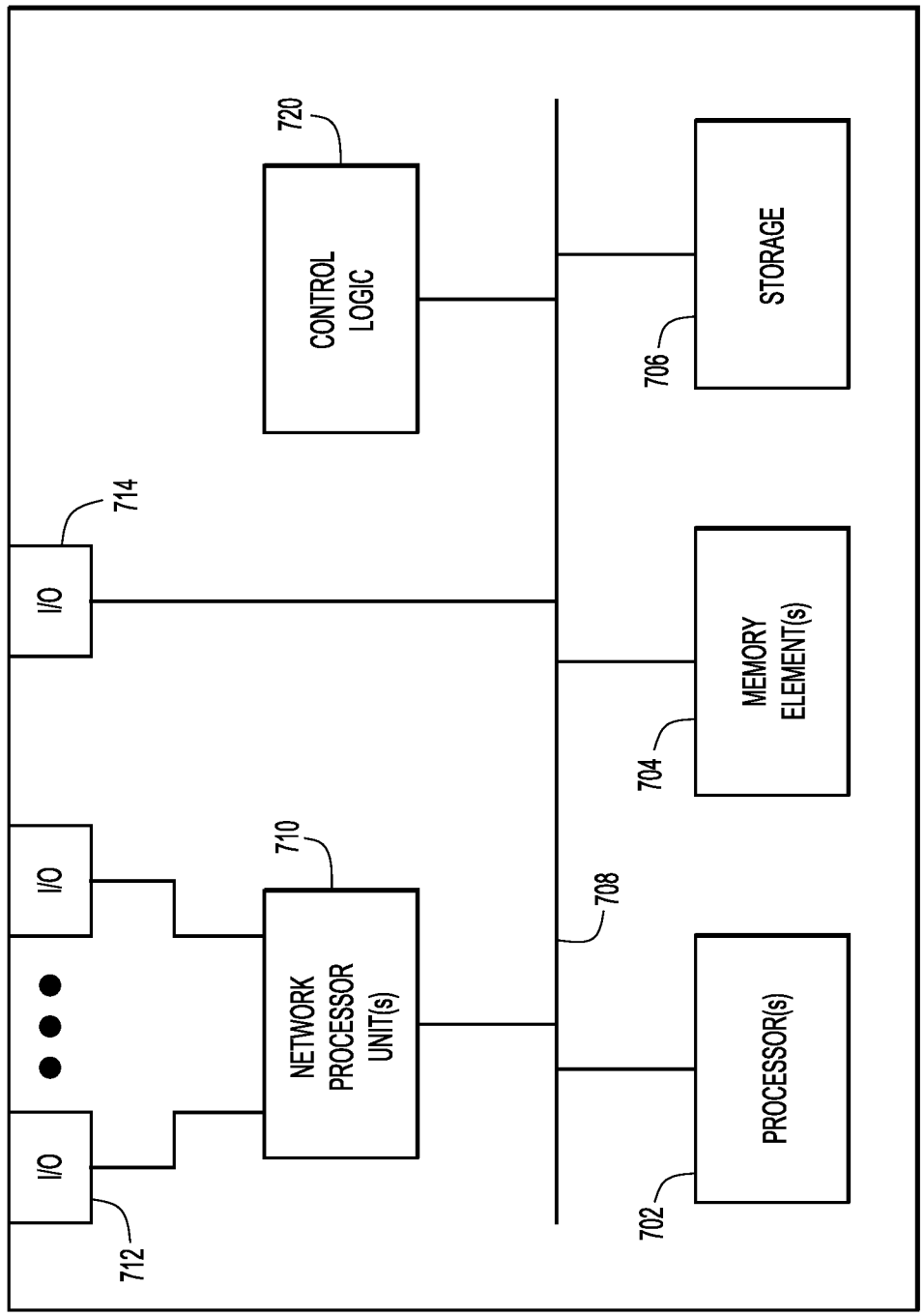
FIG. 7 is a functional block diagram of a device configured to implement the intelligent and secure packet capture techniques of the present disclosure, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor".

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment. I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. The memory element(s) 704 may be read only memory (ROM), random access memory (RAM), magnetic disk storage media devices, optical storage media devices, flash memory devices, electrical, optical, or other physical/tangible memory storage devices. Thus, in general, the memory element(s) 704 may comprise one or more tangible (non-transitory) computer readable storage media (e.g., a memory device) encoded with software comprising computer executable instructions and when the software is executed (by the processor(s) 702) it is operable to perform the operations described herein. In particular, the computing device 700 performs the operations described above in connection with FIGS. 1-6 when executing the software stored in memory element(s) 704.

Any of the memory items discussed herein should be construed as being encompassed within the broad term "memory element". Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as "messages", "messaging", "signaling", "data", "content", "objects", "requests", "queries", "responses", "replies", etc. which may be inclusive of packets. As referred to herein and in the claims, the term "packet" may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a "payload", "data payload", and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase "at least one of", "one or more of", "and/or", variations thereof, or the like are open-ended expressions that are both conjunctive and disjunctive in operation for any and all possible combination of the associated listed items. For example, each of the expressions "at least one of X, Y and Z", "at least one of X, Y or Z", "one or more of X, Y and Z", "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first", "second", "third", etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

Additionally, terms such as "transmit" and "receive" are broadly used herein to refer to techniques for providing and obtaining data in network environments. For example, data may be provided and obtained through packets transmitted and received through network environment 100 of FIG. 1. Data may also be provided and obtained through data communicated via out-of-band signaling or control channels used in network environment 100 of FIG. 1.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In summary, provided for herein are novel validation and authentication mechanisms to collect packet capture data and secure it with encryption/dedicated media instances following a user's consent. The techniques of the present disclosure provide for methods that include: configuring, via a first computing device, a packet capture operation configured to capture packets provided by a second computing device; obtaining, at the first computing device, an indication that a user is within a predetermined location proximity to the second computing device; and initiating the packet capture operation in response to obtaining the indication at the first computing device.

According to specific examples of the provided for methods, the second computing device is configured to determine that the user is within the predetermined location proximity to the second computing device; and obtaining the indication includes obtaining the indication from the second computing device in response the second computing device determining that the user is within the predetermined location proximity to the second computing device.

Other specific example embodiments of the methods include providing a message to a computing device associated with the user configured to determine that the user is within the predetermined location proximity to the second computing device; and obtaining the indication includes obtaining the indication in response to the user responding to the message. According to such specific example embodiments, the message may include a verification code; and obtaining the indication may include obtaining the verification code. For example, the verification code may include a Quick Response (QR) code or a barcode. Also according to specific example embodiments of the provided for methods, the computing device associated with the user is a device different than the second computing device; and obtaining the indication comprises obtaining the indication from the second computing device.

The provided for methods may also include configuring a third computing device to serve as a dedicated media node for the packet capture operation, and initiating the packet capture operation may include initiating the packet capture operation such that the packets provided by the second computing device are directed from the second computing device to the third computing device. According to other example embodiments, the provided for methods include generating a shared secret; and encrypting results of the packet capture operation such that the shared secret is required to access the results of the packet capture operation.

In still other example embodiments of the provided for methods, configuring the packet capture operation may include configuring the packet capture operation for the packets provided by the second computing device as part of an online collaborative session. Also according to other example embodiments of the provided for methods, the packet capture operation may include capturing the packets provided by the second computing device in a cloud network environment.

Also provided for herein is an apparatus comprising one or more network interfaces and one or more processors. The one or more processors are configured to perform operations on behalf of a first computing device, the operations including: configuring a packet capture operation configured to capture packets provided by a second computing device; obtaining, via the one or more network interfaces, an indication that a user is within a predetermined location proximity to the second computing device; and initiating, via the one or more network interfaces, the packet capture operation in response to obtaining the indication at the apparatus.

According to specific example embodiments of the provided for apparatuses, the second computing device is configured to determine that the user is within the predetermined location proximity to the second computing device; and the one or more processors are configured to perform the obtaining the indication from the second computing device in response the second computing device determining that the user is within the predetermined location proximity to the second computing device. According to other specific example embodiments, the one or more processors are configured to provide, via the one or more network interfaces, a message to a computing device associated with the user configured to determine that the user is within the predetermined location proximity to the second computing device; and the one or more processors are configured perform the obtaining the indication in response to the user responding to the message.

Also according to example embodiments of the provided for apparatuses, the message includes a verification code, and in more specific example embodiments, the verification code includes a Quick Response (QR) code or a barcode.

The techniques of the present disclosure also provide for one or more tangible non-transitory computer readable mediums. The one or more mediums are encoded with instruction that, when executed by one or more processors, are operable to perform operations including: configuring, via a first computing device, a packet capture operation configured to capture packets provided by a second computing device; obtaining, at the first computing device, an indication that a user is within a predetermined location proximity to the second computing device; and initiating the packet capture operation in response to obtaining the indication at the first computing device.

According to specific example embodiments of the provided for mediums, the second computing device is configured to determine that the user is within the predetermined location proximity to the second computing device; and the instructions operable to perform obtaining the indication may include instructions operable to obtain the indication from the second computing device in response the second computing device determining that the user is within the predetermined location proximity to the second computing device. According to other specific example embodiments of the provided for mediums, the instructions are further operable to provide a message to a computing device associated with the user configured to determine that the user is within the predetermined location proximity to the second computing device; and the instructions operable to perform obtaining the indication comprise instructions operable to obtain the indication in response to the user responding to the message.

According to still other example embodiments of the provided for mediums, the instructions operable to perform obtaining the indication may include instructions operable to obtain the verification code. The verification code may include a Quick Response (QR) code or a barcode.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    configuring, via a first computing device for analysis of a quality issue in a media stream, an administrator-initiated packet capture operation configured to capture packets of the media stream within a cloud environment provided by a second computing device arranged outside of the cloud environment;
    obtaining, at the first computing device, an indication that a user associated with the media stream is within a predetermined location proximity to the second computing device;
    authorizing the packet capture operation in response to determining that the user is within the predetermined location proximity to the second computing device based on obtaining the indication;
    initiating the packet capture operation in response to the authorizing;
    storing the packets captured via the packet capture operation; and
    providing the packets captured via the packet capture operation for analysis.

2. The method of claim 1, wherein:
    the second computing device is configured to determine that the user is within the predetermined location proximity to the second computing device; and
    obtaining the indication comprises obtaining the indication from the second computing device in response to the second computing device determining that the user is within the predetermined location proximity to the second computing device.

3. The method of claim 1, further comprising providing a message to a computing device associated with the user configured to determine that the user is within the predetermined location proximity to the second computing device; and
    wherein obtaining the indication comprises obtaining the indication in response to the user responding to the message.

4. The method of claim 3, wherein the message comprises a verification code; and
    wherein obtaining the indication comprises obtaining the verification code.

5. The method of claim 4, wherein the verification code comprises a Quick Response (QR) code or a barcode.

6. The method of claim 3, wherein the computing device associated with the user is a device different than the second computing device; and
    wherein obtaining the indication comprises obtaining the indication from the second computing device.

7. The method of claim 1, further comprising configuring a third computing device to serve as a dedicated media node for the packet capture operation, and
    wherein initiating the packet capture operation comprises initiating the packet capture operation such that the packets provided by the second computing device are directed from the second computing device to the third computing device.

8. The method of claim 1, further comprising:
    generating a shared secret; and
    encrypting the packets captured via the packet capture operation such that the shared secret is required to access the packets captured via the packet capture operation.

9. The method of claim 1, wherein the media stream comprises packets of an online collaborative session.

10. An apparatus comprising:
    one or more network interfaces; and
    one or more processors, wherein the one or more processors are configured to perform operations on behalf of a first computing device, the operations including:
        configuring, for analysis of a quality issue in a media stream, an administrator-initiated packet capture operation configured to capture packets of the media stream within a cloud environment provided by a second computing device arranged outside of the cloud environment;
        obtaining, via the one or more network interfaces, an indication that a user associated with the media stream is within a predetermined location proximity to the second computing device;
        authorizing the packet capture operation in response to determining that the user is within the predetermined location proximity to the second computing device based on obtaining the indication;
        initiating, via the one or more network interfaces, the packet capture operation in response to the authorizing;
        storing the packets captured via the packet capture operation; and providing the packets captured via the packet capture operation for analysis.

11. The apparatus of claim 10, wherein:
the second computing device is configured to determine that the user is within the predetermined location proximity to the second computing device; and
wherein the one or more processors are configured to perform the obtaining the indication from the second computing device in response the second computing device determining that the user is within the predetermined location proximity to the second computing device.

12. The apparatus of claim 10, wherein the one or more processors are configured to provide, via the one or more network interfaces, a message to a computing device associated with the user configured to determine that the user is within the predetermined location proximity to the second computing device; and
wherein the one or more processors are configured perform the obtaining the indication in response to the user responding to the message.

13. The apparatus of claim 12, wherein the message comprises a verification code.

14. The apparatus of claim 13, wherein the verification code comprises a Quick Response (QR) code or a barcode.

15. One or more tangible non-transitory computer readable mediums encoded with instructions, wherein the instructions, when executed by one or more processors, are operable to perform operations including:
configuring, via a first computing device for analysis of a quality issue in a media stream, an administrator-initiated packet capture operation configured to capture packets of the media stream within a cloud environment provided by a second computing device arranged outside of the cloud environment;
obtaining, at the first computing device, an indication that a user associated with the media stream is within a predetermined location proximity to the second computing device;
authorizing the packet capture operation in response to determining that the user is within the predetermined location proximity to the second computing device based on obtaining the indication;
initiating the packet capture operation in response to the authorizing;
storing the packets captured via the packet capture operation; and
providing the packets captured via the packet capture operation for analysis.

16. The one or more tangible non-transitory computer readable mediums of claim 15, wherein:
the second computing device is configured to determine that the user is within the predetermined location proximity to the second computing device; and
the instructions operable to perform obtaining the indication comprise instructions operable to obtain the indication from the second computing device in response the second computing device determining that the user is within the predetermined location proximity to the second computing device.

17. The one or more tangible non-transitory computer readable mediums of claim 15, wherein the instructions are further operable to provide a message to a computing device associated with the user configured to determine that the user is within the predetermined location proximity to the second computing device; and
wherein the instructions operable to perform obtaining the indication comprise instructions operable to obtain the indication in response to the user responding to the message.

18. The one or more tangible non-transitory computer readable mediums of claim 17, wherein the message comprises a verification code; and
wherein the instructions operable to perform obtaining the indication comprise instructions operable to obtain the verification code.

19. The one or more tangible non-transitory computer readable mediums of claim 18, wherein, wherein the verification code comprises a Quick Response (QR) code or a barcode.

20. The method of claim 1, wherein:
configuring the packet capture operation comprises indicating a collaboration application space for receipt of the packets captured via the packet capture operation; and
providing the packets captured via the packet capture operation for analysis comprises providing the packets captured via the packet capture operation in the collaboration application space.

* * * * *